United States Patent
Watanabe

[11] 3,746,174
[45] July 17, 1973

[54] SIMPLE WATER TREATING APPARATUS
[75] Inventor: Kouichi Watanabe, Osaka, Japan
[73] Assignee: Kurita Water Industries Ltd., Osaka, Japan
[22] Filed: Mar. 22, 1972
[21] Appl. No.: 237,034

[30] Foreign Application Priority Data
Mar. 27, 1971 Japan.............................. 46/17746

[52] U.S. Cl................. 210/282, 210/287, 210/443, 210/449
[51] Int. Cl........................................... B01d 27/02
[58] Field of Search.................... 210/282, 287, 288, 210/435, 443, 444, 449, 450, 456

[56] References Cited
UNITED STATES PATENTS
2,605,901  8/1952  Morrison et al. .................... 210/282
3,184,064  5/1965  Sampson et al................. 210/282 X
3,204,770  9/1965  Brink .................................. 210/282

Primary Examiner—Samih N. Zaharna
Assistant Examiner—Robert H. Spitzer
Attorney—Kurt Kelman

[57] ABSTRACT
In a simple water treating apparatus comprising, a magazine containing water conditioning materials through which water is passed and a body for replaceably holding said magazine formed of a case which is attached to the outlet of the water passage communicating with the water supply tap to convey water onto the upper surface of said magazine and a lid fixed to said case to close the open top end thereof and having cylindrical adaptor to engage the tap, wherein a cylindrical water passage is formed between the inner wall of the case and the outer wall of the magazine, a radial water passage communicating at its periphery with the lower part of said cylindrical water passage is formed between the upper surface of the case bottom and the lower surface of the magazine bottom and the body is provided with a water discharge pipe for conveying water from the top of said cylindrical water passage to the outside, the improvement therein of providing on said magazine a circumferential wall extending above the water passable upper surface of said magazine and providing on said lid a flexible skirt extending downwardly from the lower end of said water passage to engage with its lower periphery the inside face of said circumferential wall thereby forming a water chamber inside the skirt, between the lid and the magazine, when the magazine is inserted into the case and the lid is fixed thereto.

1 Claim, 4 Drawing Figures

Patented July 17, 1973 3,746,174

Patented July 17, 1973

3,746,174

SIMPLE WATER TREATING APPARATUS

This invention relates to an apparatus of the type wherein the water is conditioned chemically by means of water conditioning materials enclosed in a magazine.

There are known many types of simple filtering units of different structure which are attached to water outlets such as water supply taps for the purpose of filtering the water coming out of the taps.

Ordinarily in this type of apparatus one or more water conditioning materials such as active carbon which adsorbs organic and ferric components in the water, and calcium sulfite pellets which eliminate residual chlorine are enclosed in the magazine of the water treating unit. However, as more and more water is treated, the activity of these materials decreases gradually and when the activity diminishes to a certain level, replacement of the magazine with a new one becomes necessary.

To permit easy exchange of the magazine, the conventional water treating unit is made so that the body holding the magazine is easily deformed. Thus, when the water pressure at the tap is high, the body is deformed by the excessive pressure causing a flow of untreated water to by-pass the magazine and mix with the treated water and to be discharged together with it at the outlet of the water treating unit.

The apparatus of the present invention allows only the water treated inside the magazine to be discharged at the outlet. This effect is accomplished by utilizing the water pressure at the tap to prevent the flow of untreated water by-passing the magazine. The higher the water pressure the greater this effect. As for the ease of replacement of the magazine the apparatus, however, is by no means inferior to the conventional one.

The invention will now be described in detail with reference to the accompanying drawings showing one preferred embodiment of the invention.

Figure 1:
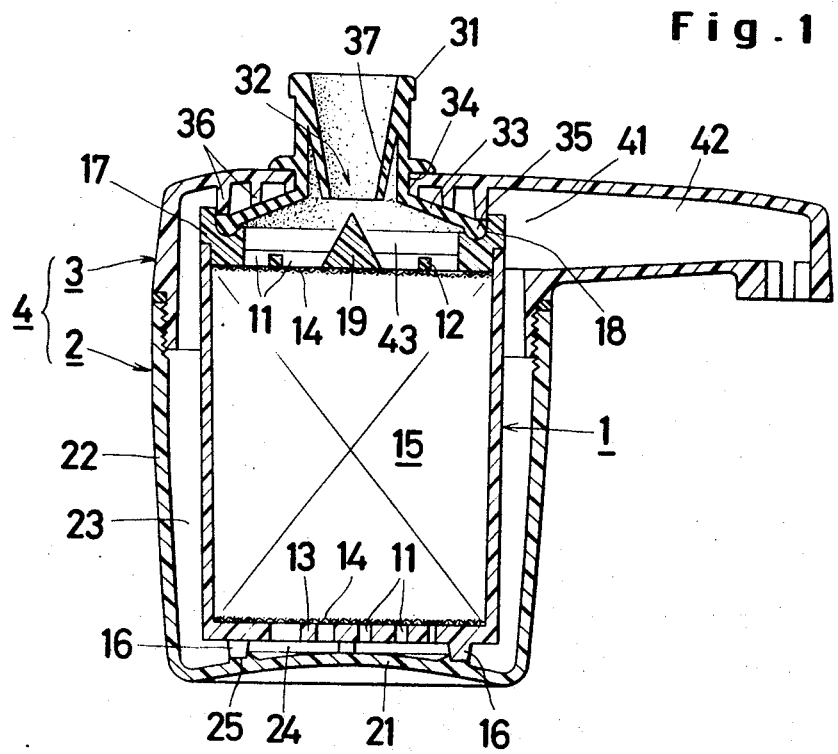
FIG. 1 is a vertical sectional view of a simple water treating apparatus provided by this invention.
Figure 2:
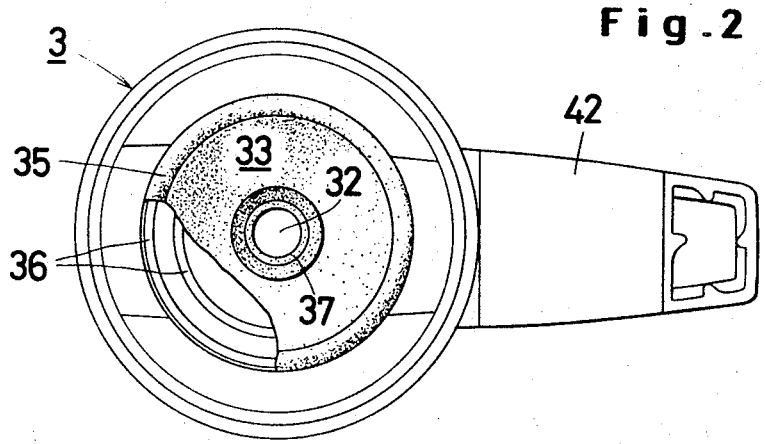
FIG. 2 is a plan view of the bottom of the lid, with a part of the skirt cut away.
Figure 3:
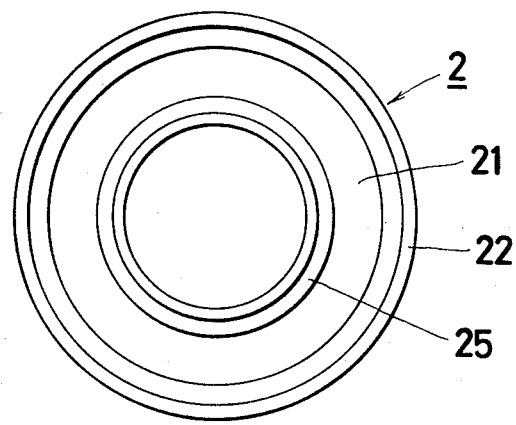
FIG. 3 is a plan view of the case of this invention.
Figure 4:
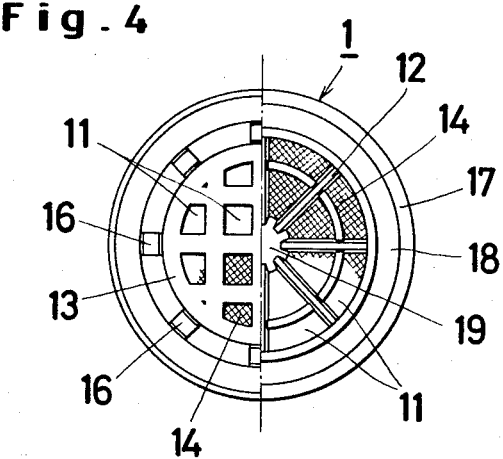
FIG. 4 shows on the left a bottom view and on the right a top view of one half of the magazine of this invention.

The water treating unit according to this invention consists of the magazine 1 containing water conditioning materials and of the body 4 formed by the case 2 which comprises a lower case opening upward to provide an opening for the replacement of said magazine 1 and the lid 3 fixed to the case 2 by means of threads.

The magazine 1 consists of a cylindrical body wall, a magazine cap 12 and a magazine bottom 13, the cap and bottom each having water passages 11 in the form of the holes or slots. A screen 14 of small mesh is applied on the inner surface of the said magazine cap 12 and bottom 13 to prevent the enclosed water conditioning material 15 from being carried out through the water passage 11.

The case 2 holds the magazine 1 on its bottom 21. This results in the formation of a cylindrical water passage 23 between the inner surface of the lateral body wall 22 and the outer surface of the magazine wall as well as in the formation, between the upper surface of the lower case and the lower surface of the magazine bottom, of the radial water passage 24 which communicates with the lower end of the cylindrical water passage 23.

In this embodiment, the magazine 1 is provided with three or more legs 16 on the lower surface of its bottom, while the bottom of the body is raised toward the center and is provided at half height with a ring shaped step 25 for supporting the legs 16. Owing to this structure, the legs 16 are firmly held by the step 25 and the magazine is fixed immobile vertically inside the body forming a stable cylindrical water passage 23 as well as a radial water passage 24 communicating with the lower end of the cylindrical water passage 23 by holding the magazine at a certain height up from the surface of the bottom of the lower case. However, even without the legs 16, the radial water passage 24 can also be formed by providing grooves on either or both of the lower surface of the magazine bottom and the upper surface of the lower case.

The lid 3 is provided with a cylindrical adaptor 31 for fixing the unit to the tap. Naturally, the lower end 32 of the said cylindrical adaptor 31 is opened on the lower surface of the lid 3.

The body 4 is provided, on the case or on its lid, with an opening 41 from which protrudes an horizontal water discharge pipe 42.

According to this invention, the lid 3 is provided with the skirt 33 on its lower surface, with the top of the said skirt surrounding the lower end 32 of the said cylindrical adaptor 31. Moreover, the magazine 1 is so designed that the lower circumference of the skirt 33 fits perfectly on the inner surface of the circumferential wall 17 protruding up around the water conveying magazine cap 12. While the skirt 33 is made of a flexible material which allows it to be easily puffed up outward by the water pressure, the circumferential wall 17 is constituted of a hard material.

The cylindrical adaptor and the skirt of the illustrated embodiment are formed is one block of a rubber like material. The slot 34 on the outer circumference of the neck at their junction engages the edge of the opening in the top of the lid in such a manner that the cylindrical adaptor protrudes out from the cap, while the skirt hangs down from the lower surface.

In this embodiment, the case and the lid are made separately of plastic material.

The circumferential wall 17 can be made protruding up over the water conveying magazine cap as in the illustrated embodiment, but if the cap is to be fitted inside the magazine wall, the latter can be made protruding up higher than the magazine cap.

The walls of the magazine may also be made of plastic materials.

Moreover, as in the illustrated embodiment, a thick reinforcing rim 35 can be provided along the lower edge of the skirt 33, while a slot 18, to receive the said reinforcing rim 35 can be made on the lower circumference of the circumferential wall 17 or on the upper circumference of the magazine cap which borders the circumferential wall, so that the skirt and the circumferential wall are united not only by a simple free cushion joint but also by an essentially mechanical joint.

The water treating apparatus according to this invention can initially be assembled by removing the lid from the case introducing in the magazine 1 from the top and again fixing the lid on the case. It can also be assembled in such a manner that the user can himself replace the magazine when the activity of the water conditioning materials decreases.

Since, in the assembled apparatus, the skirt 33 is fitted on the inner surface of the circumferential wall of the magazine, it forms inside the body a water chamber 43 which, having the cylindrical adaptor 31 as its top and the magazine cap as its bottom, is isolated from the cylindrical water passage 23.

Consequently, when the apparatus is fixed to a water supply tap by means of the cylindrical adaptor, the water flowing out from the tap passes through the water chamber and down through the layer of water conditioning materials contained in the magazine 1 to have its purity improved, then leaves the radial water passage and flows up the cylindrical water passage and discharges out of the discharge pipe 42. Since the skirt is made of a flexible material, it is puffed up outward against the inside of the circumferential wall in proportion to the pressure of the water entering the water chamber, thus effectively preventing the water from leaking directly into the cylindrical water passage under its own pressure.

Consequently, this invention provides for a simple water treating apparatus which not only provides for easy replacement of the magazine but also completely prevents the leakage of untreated water from the magazine into the discharge pipe, making it possible for the user to use confidently the water flowing out of the discharge pipe.

This invention also provides a conical guide 19 installed vertically on the center of the upper surface of the magazine cap pointing toward the center of the lower opening of the cylindrical adaptor. This guide serves to evenly distribute the water entering the chamber 43 around the chamber periphery in order to make water flow even throughout the magazine. Further, as shown in the drawing, radial or concentric rims 36 are provided on the lid 3 as internal parts thereof to fix the skirt 33 from above in order to strengthen the lid 3 as well as to prevent the skirt 33 from being rolled over by the water pressure inside the water collector and an insert cylinder 37 is provided inside the cylindrical adaptor 31, with its upper edge joined to the adaptor wall and its lower rim free, so that when inserted over the tap it is pressed against the tap by the water pressure inside the water chamber 43 thus strengthening the connection between the apparatus and the tap.

I claim:

1. In a simple water treating apparatus comprising
   a magazine containing water conditioning materials through which water is passed and
   a body for replaceably holding said magazine formed of a case having an open top which is attached to the outlet of a water passage communicating with a water supply tap to convey water onto the upper surface of said magazine and a lid fixed to said case to close the open top end thereof and having a cylindrical adaptor to engage the tap,
   wherein a cylindrical water passage is formed between the inner wall of the case and the outer wall of the magazine, a radial water passage communicating at its periphery with the lower part of said cylindrical water passage is formed between the upper surface of the case bottom and the lower surface of the magazine bottom and the body is provided with a water discharge pipe for conveying water from the top of said cylindrical water passage to the outside,
   the improvement therein of providing on said magazine a circumferential wall extending above the water passable upper surface of said magazine and providing on said lid a flexible skirt extending downwardly from the lower end of the first mentioned water passage to engage with its lower periphery the inside face of said circumferential wall thereby forming a water chamber inside the skirt, between the lid and the magazine, when the magazine is inserted into the case and the lid is fixed thereto.

* * * * *